(12) United States Patent
Mannonen et al.

(10) Patent No.: US 10,022,759 B2
(45) Date of Patent: Jul. 17, 2018

(54) METHOD FOR REFINING OF IN POWER PLANTS PRODUCED COAL ASH AND COAL CONTAINING ASHES PRODUCED IN OTHER COMBUSTION PROCESSINGS

(71) Applicant: MICROPULVA LTD OY, Pirkkala (FI)

(72) Inventors: Risto Mannonen, Espoo (FI); Jouko Niemi, Pirkkala (FI)

(73) Assignee: MICROPULVA LTD OY, Pirkkala (FI)

( * ) Notice: Subject to any disclaimer, the term of this patent is extended or adjusted under 35 U.S.C. 154(b) by 0 days.

(21) Appl. No.: 15/553,463

(22) PCT Filed: Feb. 26, 2015

(86) PCT No.: PCT/FI2015/000007
§ 371 (c)(1),
(2) Date: Aug. 24, 2017

(87) PCT Pub. No.: WO2016/135368
PCT Pub. Date: Sep. 1, 2016

(65) Prior Publication Data
US 2018/0015514 A1    Jan. 18, 2018

(51) Int. Cl.
*B03D 1/02* (2006.01)
*B09B 3/00* (2006.01)
(Continued)

(52) U.S. Cl.
CPC .......... *B09B 3/00* (2013.01); *B03B 5/28* (2013.01); *B03D 1/02* (2013.01); *C04B 7/12* (2013.01);
(Continued)

(58) Field of Classification Search
CPC .... B03D 1/02; B09B 3/00; B03B 5/28; C04B 7/12; C04B 7/60; C04B 7/427; C10L 5/447
See application file for complete search history.

(56) References Cited

U.S. PATENT DOCUMENTS 3,794,250 A * 2/1974 Brewer .................. C01B 32/05
                                                209/166
5,840,179 A * 11/1998 Minkara ................. B02C 19/18
                                                209/166
(Continued)

FOREIGN PATENT DOCUMENTS

CN    101797575    8/2010
CN    103128097    6/2013
(Continued)

OTHER PUBLICATIONS

International Search Report for PCT/FI2015/000007, dated May 20, 2015.
(Continued)

*Primary Examiner* — Thomas M Lithgow
(74) *Attorney, Agent, or Firm* — B. Aaron Schulman; Stites & Harbison, PLLC

(57) ABSTRACT

A method for industrial refining of coal ash created in power plants and carbonaceous ashes produced in other combustion processes by separating coal from said ashes and returning it to use and by recovering a substantially coal-free ash fraction obtained in the refining. In the method, coal ash and at least one ash fraction created by gasification technique in combustion plants are carefully proportioned in relation to one another and formed into a slurry mixture by means of an efficient dispersion technique, the slurry being then led to a flotation step, where a fraction rich in coal and a siliceous fraction poor in coal and a fraction dissolving in the process water are separated by flotation. The coal ash is arranged to have the highest proportion in the mixture to be taken to flotation, the ashes from combustion plants being dosed into said mixture in an amount that does not cause the maximum amounts of harmful substances to be exceeded in the qualities of the carbonaceous product and the silicate product poor in coal to be obtained.

2 Claims, 1 Drawing Sheet

(51) Int. Cl.
  *B03B 5/28* (2006.01)
  *C04B 7/12* (2006.01)
  *C04B 7/60* (2006.01)
  *C10L 5/44* (2006.01)
  *C04B 7/42* (2006.01)

(52) U.S. Cl.
  CPC ............... *C04B 7/427* (2013.01); *C04B 7/60* (2013.01); *C10L 5/447* (2013.01); *C10L 2290/54* (2013.01)

(56) References Cited

U.S. PATENT DOCUMENTS

| | | | |
|---|---|---|---|
| 5,936,216 A * | 8/1999 | Wu | ............................ B03B 9/04 106/705 |
| 7,993,450 B2 | 8/2011 | Abe et al. | |
| 2011/0138686 A1 | 6/2011 | Mannonen et al. | |

FOREIGN PATENT DOCUMENTS

| | | |
|---|---|---|
| FI | 121299 | 9/2010 |
| FI | 20130249 | 3/2015 |
| JP | 2010227769 | 10/2010 |

OTHER PUBLICATIONS

Finland Search Report for FI 20130249, dated May 19, 2014.
Written Opinion of the International Searching Authority for PCT/FI2015/000007, completed May 11, 2015.
Ahmaruzzaman M, Review on the utilization of fly ash. Progress in Energy and Combustion Science, Jan. 6, 2010, vol. 36, No. 3, s. 327-363 kappale "Leaching of fly ash in water system" sivuilla 343-344.
Blissett R.S. & Rowson N.A. A review of the multi-component utilisation of coal fly ash. FUEL, Dec. 3, 2012, vol. 97, s. 1-23 sivu 13 viimeinen kappale—sivu 14 ensimmainen kappale.

\* cited by examiner

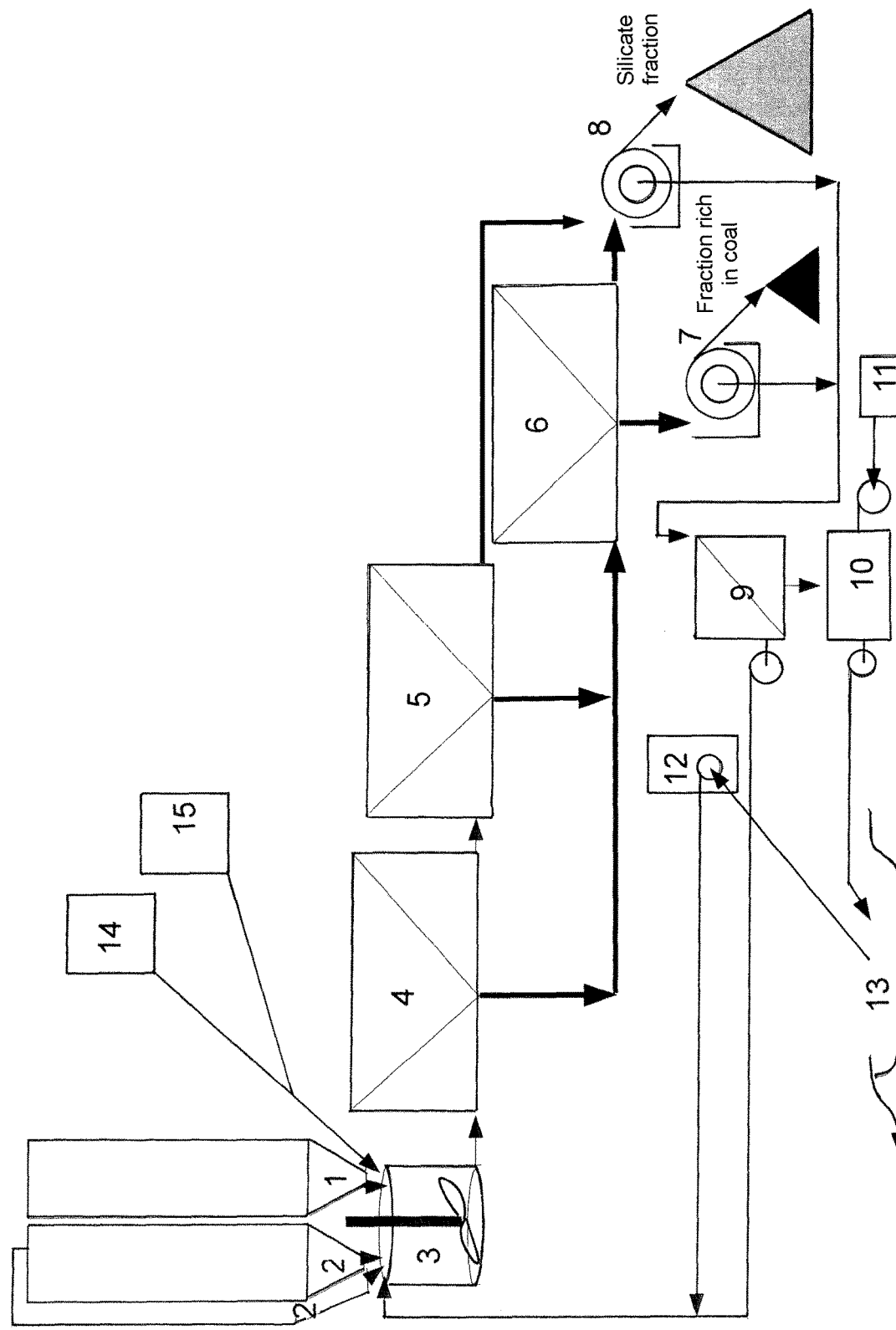

METHOD FOR REFINING OF IN POWER PLANTS PRODUCED COAL ASH AND COAL CONTAINING ASHES PRODUCED IN OTHER COMBUSTION PROCESSINGS

The invention relates to a method for industrial refining of coal ash created in power plants and of carbonaceous ashes produced in other combustion processes by treating a carefully proportioned mixture of these ashes in a common flotation process, by separating, after an efficient dispersion step, a carbonaceous fraction from said coal ash and from ash produced in the other combustion processes employing recycled fuels by utilizing a flotation technique, which fraction may be returned to combustion or used in other processes employing energy, and by recovering an essentially coal-free ash fraction obtained as a result of the refining and containing pozzolanic properties, the fraction being suitable for use as a binder.

Experiments have also shown that the concentration process according to the method, based on using the chemicals needed and because of the working principles of the process, enables harmful compounds, such as different chlorine compounds contained in gasification ash in particular and dissolving in the process waters, to be separated from the fractions of ashes being processed. These compounds that become concentrated in the process waters may be removed from the process water circulation mechanically or chemically by precipitation. The proportions of chlorine compounds and other harmful compounds in the carbon and silicate products obtained in the concentration process must be brought to the prescribed level to ensure the usability of the products.

It is commonly known that coal ash, which typically accounts for 14 to 16% of the amount of burnt coal, may be used as such in concrete products and in other dry products used in construction and concrete work applications. Stricter limits for flue gas emissions of power plants have led to an increase in the carbon content of coal ash and therefore the ashes produced mostly end up in landfills.

Likewise, it is commonly known that utilisation of ashes produced in other different types of REF (recovered/recycled fuel) combustion processes, in which the proportion of ashes is 5 to 7% of that of the recycled fuel, is problematic due to variations in fuel quality and the extremely varied composition of fly ashes. Because of their diverse chemical compositions, ashes created from fuels burnt in different REF combustion processes must generally be handled as problem waste. High handling costs of problem waste impede the use of combustion processes utilizing waste.

Coal ash created in power plants contain varying amounts of unburnt coal from a value of 1% to as high as 20%. The ash material in coal ash mostly consists of spherical particles that are vitrified silicate minerals.

The particle shape is advantageous and enables fly ash created from coal combustion to be utilized in various applications, provided that its coal content is sufficiently low and stable. Coal ash contains only little of those harmful substances that are commonly encountered in significantly higher amounts in other ashes created in connection with recycled fuel combustion in other combustion plants. Moreover, the quality of fly ash created in combustion of coal remains stable because there is no significant variation in the composition and quality of the coal to be burned.

In other combustion processes that make use of recycled fuels, the composition of fly ash material differs markedly from that of fly ashes produced in coal combustion because of the raw material and the combustion process used. These ashes produced from REF fuels, whose quantity is much smaller in comparison with combustion of coal, often contain high amounts of harmful substances and a lot of coal, typically as much as 15 to 40%.

Ash fractions created typically from recycled fuels in other combustion processes exclusively are extremely difficult to process efficiently in a flotation process. The reason for this is that on the surfaces of ash particles there are compounds of materials that interfere with the selectivity of the flotation process. The extremely varied chemical composition of the ash fraction and its significantly higher degree of fineness compared with coal complicate the process. Selective concentration of the coal compounds in the product fractions and the non-combustible materials fraction by means of flotation does not succeed well enough.

It is extremely difficult to render the quality of products made with the flotation technique from fly ashes created from REF fuel alone such that the products would be suitable for energy production or as binder in a pozzolanic application.

It has now been experimentally shown that by formulating a carefully defined mixture of coal ash and fly ash produced from REF fuels in other combustion processes so that most of the ash mixture consists of fly ash from coal combustion, flotation products are obtained from the mixture in a flotation process by using efficient dispersion, collector and depressant chemicals, of which products a foamed, more active carbonaceous product is suitable for energy use and a siliceous product that has remained unfoamed typically suitable as a pozzolanic binder.

This proportioning and flotation technique now developed also allows fly ash produced from REF fuel combustion to be utilised in product development.

Careful and correct proportioning, efficient dispersion and appropriate flotation chemicals enable two ash fractions differing in quality and in properties to be processed simultaneously and successfully by means of the flotation technique. In addition, harmful chemical compounds bound in the gasification ash can be led efficiently in the same process into process water circulation, from where they can be removed by an efficient chemical or mechanical purification technique.

In the process now developed the core of the mass to be processed consists of coal fly ash having a clearly more stable and simpler composition, which is created in combustion of coal alone.

It is important that one of the ashes to be refined in the process described here has a stable and known quality. The clearly higher proportion of coal fly ash renders the foamed slurry more stable and provides end products of constant quality.

In other combustion processes one or more fly ash fractions typically produced from recycled fuels may be processed simultaneously, and the fineness of these ashes may differ from that of coal ash significantly. The method of the invention is characterised by what is stated in the claims.

BRIEF DESCRIPTION OF THE DRAWING FIGURE

FIG. 1 discloses an ash flotation process.

In the following, the invention will be explained in greater detail with reference to the accompanying FIG. 1.

Fly ashes having different compositions and properties, which have been carefully proportioned in relation to one another, come from a coal ash silo 1 and combustion plant silo 2 to flotation and are first processed in a dispersion apparatus 3, where strong mechanic stirring is used, preferably by making use of the spherical particle shape of the coal fly ash, to clean and activate the surfaces of particles contained in the fly ashes of recycled fuels and to disseminate agglomerates consisting of small particles before the flotation step. The dispersion may be carried out in a plural number of steps, starting with a thicker slurry and in the last step the slurry thickness is then right for the flotation step. A collector oil, such as a bio oil, typically pine oil 14, used in flotation is also added in the dispersion step. The flotation oil is used for recovering carbonaceous particles from the process and, at the same time, the flotation oil detaches harmful compounds, such chlorides, from the ash products and dissolves them into the process water, whereby solid coal and silicate fractions become purified.

In addition, a depressant chemical 15 is added in the dispersion step to prevent the silicate fraction from foaming and to improve the selectivity of the flotation process. There are a plural number of flotation steps 4, 5 in the process, and an iteration step 6 to increase the coal content of the final product rich in coal to a sufficiently high level.

The ash flotation process works in a closed water circulation. In the treatment process, chlorides and other harmful substances dissolved in the water are purified mechanically and chemically 9, 10, 11 from the process circulation water. Water from the coal and silicate products produced in the flotation process is removed in a mechanical filtration step 7 and 8, and the filtrate waters are led to the process water circulation, which is replenished by at least the amount of water, supply 12, that exits with the moisture contained in the filtered end products. The purified process water is collected into a basin 13, and harmful product fractions that have been precipitated and mechanically separated are stored 16 for further processing. The amount of these fractions is extremely small compared with the original amount of the gasification ash. The amount of the filtrate water removed in the filtration of the fraction 7 rich in coal is substantially smaller than the amount of water in the silicate fraction 8. The coal concentrate is reactive, because it contains an extremely fine fraction of 0.1 to 2 μm having a large specific area of cm$^2$/g because of the shape of the coal particles. This causes the chlorine compounds and other harmful substances to concentrate in the slurry rich in coal. The chlorine compounds are mostly in the slurry rich in coal and the in water filtered therefrom.

The sufficiently low coal content of the silicate product is created in the flotation process, where the carbonaceous fraction is separated from the ash mixture.

In the flotation process now developed the coal content of the carbonaceous fraction may be >50%. The coal fraction is mostly of anthracite, i.e. coke, and its thermal value is significantly higher than that of coal.

The non-combustible, typically pozzolanic silicate fraction has a coal content of <4% and it may thus be used as a binder in cement and concrete industry. Efficient use and purification of process waters ensures that the amount of chlorine compounds typically does not prevent the product from being utilized in the cement and concrete industry.

An advantage of the invention is that coal ash and ashes produced in combustion plants typically by gasification allow a raw material to be obtained that is preferably free of coal and typically suitable as a binder, and also the separated coal may be re-used as fuel, for example, or for other purposes.

The invention claimed is:

1. A method for industrial refining of coal ash and carbonaceous ashes produced in other combustion processes of gasification plants by separating coal from said ashes and returning it to use and by recovering a substantially coal-free ash fraction obtained in the process, wherein coal ash and at least one ash fraction created by gasification technique in combustion plants are carefully proportioned in relation to one another and formed into a slurry mixture by means of an efficient dispersion technique, the mixture being then led to a flotation step, where a fraction rich in coal and a siliceous fraction poor in coal and a fraction dissolving in the process water are separated by flotation, the coal ash is arranged to have the highest proportion in the mixture to be taken to flotation, ash from combustion plants being dosed into said mixture in an amount that does not cause the maximum amounts of harmful substances to be exceeded in the qualities of the carbonaceous product and the silicate product poor in coal to be obtained, the flotation process uses water as a medium and the siliceous ash material and coal are separated therein, the separation being based on the active characteristic of coal to easily foam and the characteristics of the dissolving harmful compounds to dissolve into the process water during the concentration process, the purification of the process circulation water is mainly directed to water that is produced by filtering a coal concentrate slurry produced in the flotation, said purification thus allowing a more efficient end result to be obtained, while the amount of water to be purified is significantly smaller than the amount of water produced from the silicate fraction slurry, and also the dissolution of the chlorine compounds being significantly greater in this precise amount of water filtered from the coal concentrate slurry.

2. A method as claimed in claim 1, wherein the coal content of the silicate fraction is monitored and used for adjusting the amount of ash coming to the flotation process from other combustion plants.

* * * * *